United States Patent
Park

(10) Patent No.: US 10,418,007 B2
(45) Date of Patent: Sep. 17, 2019

(54) MUSICAL INSTRUMENT STAND

(71) Applicant: Hae Min Park, Seoul (KR)

(72) Inventor: Hae Min Park, Seoul (KR)

( * ) Notice: Subject to any disclaimer, the term of this patent is extended or adjusted under 35 U.S.C. 154(b) by 0 days.

(21) Appl. No.: 16/085,773

(22) PCT Filed: Oct. 20, 2016

(86) PCT No.: PCT/KR2016/011799
§ 371 (c)(1),
(2) Date: Sep. 17, 2018

(87) PCT Pub. No.: WO2017/164477
PCT Pub. Date: Sep. 28, 2017

(65) Prior Publication Data
US 2019/0103078 A1    Apr. 4, 2019

(30) Foreign Application Priority Data
Mar. 21, 2016    (KR) .......... 10-2016-0033178

(51) Int. Cl.
*G10G 5/00*    (2006.01)
*B65D 5/00*    (2006.01)
*F16M 11/20*    (2006.01)

(52) U.S. Cl.
CPC .......... *G10G 5/00* (2013.01); *B65D 5/00* (2013.01); *F16M 11/2085* (2013.01); *F16M 2200/028* (2013.01)

(58) Field of Classification Search
CPC ...... G10G 5/00; B65D 5/00; F16M 2200/028; F16M 11/2085
See application file for complete search history.

(56) References Cited

U.S. PATENT DOCUMENTS

| 6,720,490 B1* | 4/2004 | Bruce | ................. A47B 19/002 |
| | | | 84/327 |
| 2007/0131080 A1* | 6/2007 | Moody | ................... G10D 3/08 |
| | | | 84/267 |

FOREIGN PATENT DOCUMENTS

| JP | 2002-278545 A | 9/2002 |
| JP | 2005-189718 A | 7/2005 |
| KR | 10-2011-0083033 A | 7/2011 |
| KR | 10-2013-0106650 A | 9/2013 |
| KR | 10-2014-0019665 A | 2/2014 |
| KR | 10-1485262 B1 | 1/2015 |

OTHER PUBLICATIONS

International Search Report dated Jan. 12, 2017 for corresponding International Application No. PCT/KR2016/011799.

* cited by examiner

*Primary Examiner* — Kimberly R Lockett
(74) *Attorney, Agent, or Firm* — Pearne & Gordon LLP

(57) ABSTRACT

The present application introduces a musical instrument stand which can be easily carried or installed, comprising: a first part in which a stopper piece extends upward on one side of a support body for placing musical instrument; a second part elastically connected to the first part and extendable in the longitudinal direction with respect to the first part; and a locking means provided on the first and second parts and a fixing force to a counterpart.

12 Claims, 5 Drawing Sheets

MUSICAL INSTRUMENT STAND

TECHNICAL FIELD

The present invention relates to a musical instrument stand, and more particularly, to a musical instrument stand which is convenient to carry and mount the musical instrument thereon.

BACKGROUND ART

An example of a stand for a musical instrument, particularly, for a guitar mainly focused on the present invention is introduced in Japanese Laid-Open Patent No. 2002-278545.

As shown in the stand in the above-described publication, generally, a conventional musical instrument stand is not manufactured to be portable. The conventional musical instrument may be movable for a short distance according to necessity but is not always portable.

When a performer lays a musical instrument down for a moment during a practice, in the case in which there is no stand, the musical instrument has to lean on a wall or be laid down, but no performer desires to neglect a cherished musical instrument.

Further, a conventional stand as shown in the above-described publication has a large volume. When a plurality of musical instruments have to be stood up to be kept in one space such as a practice room, the conventional stand occupies too much space.

DISCLOSURE

Technical Problem

The present invention is directed to providing a new musical instrument stand capable of solving a problem in the above-described conventional art.

Further, the present invention is directed to providing a musical instrument stand having a size such as to portable and easily movable by a performer.

In addition, the present invention is directed to providing a musical instrument stand portable in a state of being mounted on a musical instrument in relation to portability.

In addition, the present invention is directed to providing a musical instrument stand which may be conveniently used and has a higher level of installability than the conventional art.

Technical Solution

The present invention provides a musical instrument stand which is inserted into a lower part of a musical instrument, for example, a lower part of a sound box of a guitar in a pedestal shape so that the musical instrument is stood up and fixed.

A conventional musical instrument stand is configured in a tripod shape as shown in Japanese Laid-Open Patent No. 2002-278545 and generally have a fork portion configured to support a box at a lower part and a fork portion configured to support a neck at an upper part. The musical instrument is obliquely stood up while leaning on the stand.

Unlike the above-described conventional musical instrument stand, a musical instrument stand according to the present invention has a box thereof at a lower part and a neck part at an upper part to be vertically stood up and fixed. Separate configurations for supporting or holding the musical instrument are not necessary.

Vertically standing and fixing the musical instrument may seem to be unstable but may actually be stable. The musical instrument may be stable enough, and a tendency for obliquely standing up and fixing the musical instrument may be a conventional stereotype which prevents the appearance of a convenient and new stand.

An idea for the musical instrument stand according to the present invention starts from recognition that the musical instrument may be correctly stood by approximately two horizontal supports, legs, or feet being inserted into a musical instrument body or a lower part of the sound box. The musical instrument according to the present invention may maintain stability in every direction at in an erected state.

A musical instrument stand according to an embodiment of the present invention may include a first part having a stopper piece configured to extend in an upward direction from one side of a support body on which the musical instrument is laid; a second part having a structure laterally symmetrical to the first part and elastically connected to the first part to be extendable in a longitudinal direction with respect to the first part; and a locking means provided on the first and/or second parts to provide a fixing force to a counterpart.

According to an embodiment of the present invention, the route part may have a front bent in an arc shape towards a slider, and the slider is pressed by the front or engaged with the front to be fixed at a locking location. In a process of rotating a locking handle to the locking location, a force may be provided in a frontward direction toward the slider by the route part.

According to an embodiment of the present invention, the support body of each of the first and second parts may have a round lower edge in a longitudinal direction. A pad formed of an elastic material may be provided on a lower part of each support body, and the pad may have a round edge in a longitudinal direction. As described above, the round lower edge may improve freedom for selecting a location in which the musical instrument stand may be inserted into the lower part of a sound box.

Advantageous Effects

A musical instrument stand according to the present invention as described above can be manufactured in a size which can be inserted into a lower part of a musical instrument body and thus can be portable and easily moved by a performer.

Further, since installing the musical instrument stand according to the present invention is completed by fixing the stand (a first part and a second part) with a locking means after the stand extends and is inserted into the lower part of the musical instrument body, the musical instrument stand can be conveniently used and have a greater fixing force and thus provide various conveniences that can be accommodated in a musical instrument case to be moved in a state of being mounted on the musical instrument and can stably stand the musical instrument up in any performing environment, to a performer.

In addition, the musical instrument stand according to the present invention requires only a function of being elongated to be fixable to a sound box of the musical instrument, and thus can be easily manufactured in a simple structure.

In addition, the musical instrument stand according to the present invention can be manufactured in a size having a thickness similar to that of the sound box and can be accommodated in the musical instrument case in the state of being mounted on the musical instrument to be moved like a guitar capo, and thus the present invention is convenient.

In addition, since the musical instrument stand according to the present invention can be used in the state of being mounted on the musical instrument, the musical instrument can be stood up at any time by the performer according to necessity while moving or performing and thus the present invention is convenient. When the stand is mounted, the musical instrument musical can be stood up even when being accommodated in the musical instrument case.

DESCRIPTION OF DRAWINGS

FIG. 4 is a view for describing a locking means of the musical instrument stand according to the embodiment of the present invention, wherein

MODES OF THE INVENTION

Figure 1:
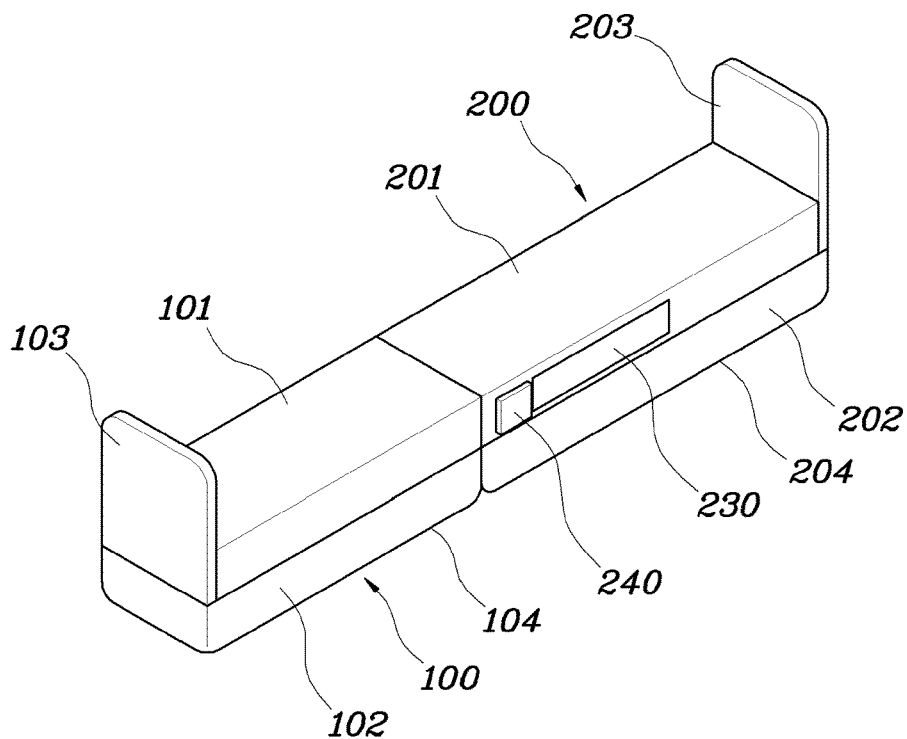
FIG. 1 is a view illustrating a musical instrument stand according to an embodiment of the present invention.

Hereinafter, the present invention will be described in detail with reference to the accompanying drawings therein. The identical components or elements in the drawings will be denoted as the same reference numerals for convenience of description.

Referring to FIG. 1, a musical instrument stand according to an embodiment includes support bodies 101 and 201 configured to support a musical instrument and stopper pieces 103 and 203 configured to extend in an upward direction from both ends of a longitudinal direction. The musical instrument stand includes two parts 100 and 200 which are elastically connected to each other and extendable.

Figure 2:
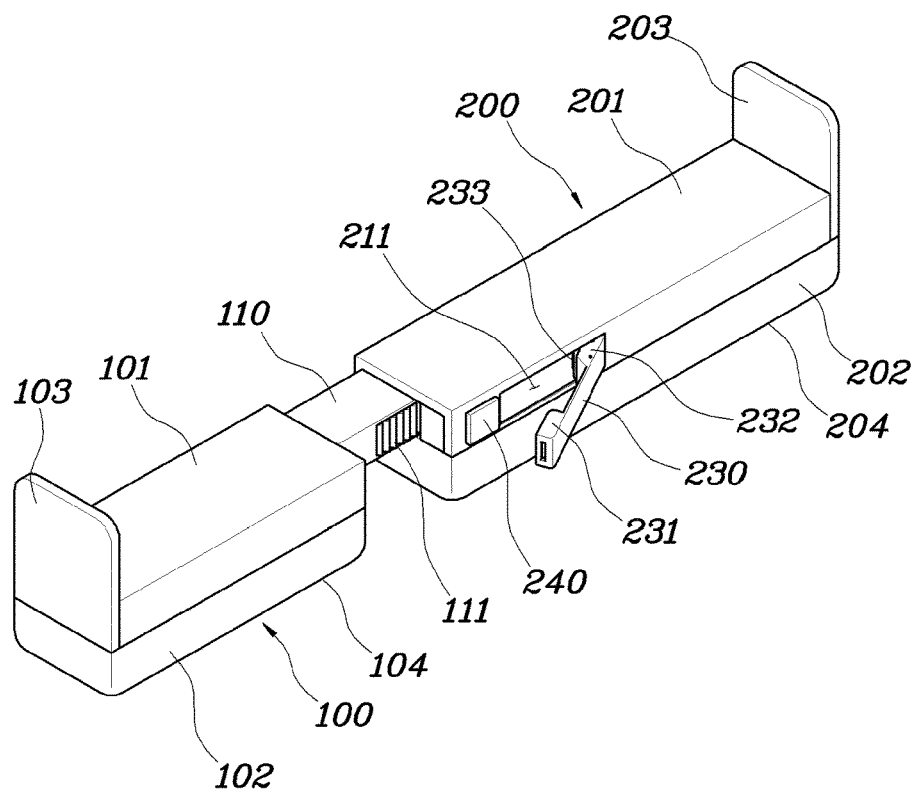
FIG. 2 is a view illustrating one state in which a locking handle rotates from a locking location to an unlocking location in the musical instrument stand shown in FIG. 1.
Figure 3:
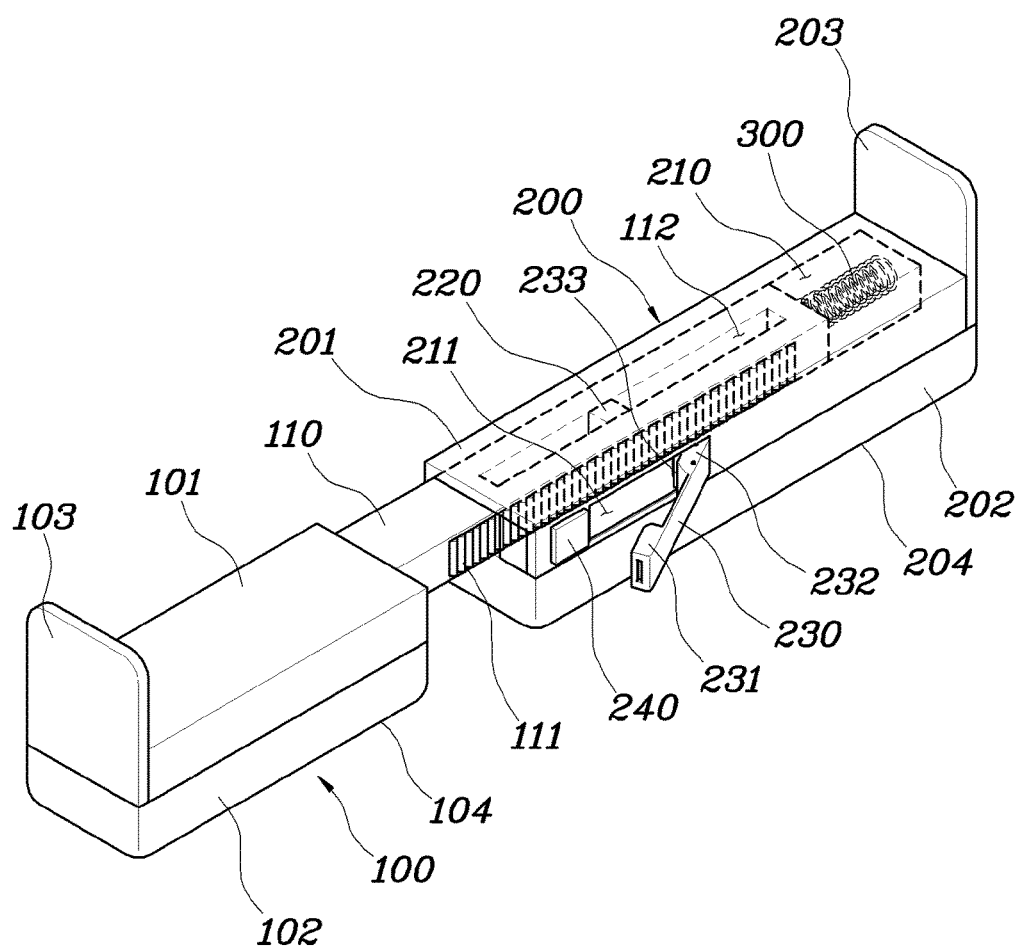
FIG. 3 is a view illustrating an inner structure of the musical instrument stand shown in FIG. 2.

FIG. 1 illustrates a state in which the musical instrument stand is not used on the musical instrument, that is a state in which the musical instrument is carried by a user, and in order to use the musical instrument stand on the musical instrument, a locked state between the first part 100 and the second part 200 (see FIG. 1) should be released and a length of the stand should extend (see FIGS. 2 and 3).

The first and second parts 100 and 200 will be seen in more detail with reference to FIGS. 1 to 3.

The first part 100 has a structure in which the stopper piece 103 is formed on one side of a longitudinal direction of the support body 101 and a slider 110 extends in a longitudinal direction from the other end of the support body 101.

The support body 101 is a member configured to lay the musical instrument thereon, wherein a musical instrument contact part may have not a surface structure but a frame structure, and the stopper piece 103 serves to hold the musical instrument laid on the support body 101 in a lateral direction. The support body 201 and the stopper piece 203 of the second part 200 are the same as the support body 101 and the stopper piece 103.

The slider 110 is one of elements which allow the first part 100 to move in a frontward direction on the basis of the second part 200 when stretched. The slider 110 is inserted into an accommodation groove 210 formed in the second part 200 and is connected to the second part 200 in the accommodation groove 210 by an elastic spring 300.

As shown in FIG. 3, a slit 112 is formed in a longitudinal direction of the slider 110. The slit 112 is one of elements which allow movement of the slider 110, that is, stretching movement of the first and second parts 100 and 200 to move in a frontward direction. The slit 112 is formed to pass from an upper surface of the slider 110 to a lower surface of the slider 110.

First teeth 111 are formed on a side surface of the slider 110 along the longitudinal direction of the slider 110. The first teeth 111 are one of the locking means which provide a fixing force to each of the first and second parts 100 and 200. Second teeth 233 formed on a route part 232 of a locking handle 230 which will be described below are engaged with the first teeth 111 at a particular location or a particular interval.

The second part 200 has a structure provided with the support body 201 and the stopper piece 203 and laterally symmetrical to the first part 100. Lateral symmetry does not mean that both parts 100 and 200 have the same length or shape. The parts 100 and 200 correspond to each other and thus are similarly disposed.

In a longitudinal direction of the second part support body 201, the stopper piece 203 of the second part 200 opposite the stopper piece 103 of the first part 100 is formed on one side, and an inlet of the slider accommodation groove 210 is formed in the other side. The slider accommodation groove 210 is formed to an appropriate width and depth along a longitudinal direction of the second part 200.

A guide 220 is installed in the second part support body 201. The guide 220 is disposed in the accommodation groove 210 and fitted to the slit 112 of the slider 110 inserted into the accommodation groove 210. The guide 220 is one of elements which ensure straight frontward movement of the slider 110 and is formed in a shape which is fitted to the slit 112 and capable of preventing a flow of the first part 100. According to the embodiment, the guide 220 is formed in a rectangular parallelepiped shape.

Continuously referring to FIGS. 1 to 3, the locking handle 230 is formed in a side surface of the second part support body 201, particularly a location facing the first teeth 111 of the slider 110. The locking handle 230 is installed in an installation space 211 of the support body 201 to be capable of performing locking or unlocking using a one-touch method or a snap method.

The locking handle 230 has a head part 231 which is a free end, and a route part 232 axially fixed to the second part support body 201 to be rotatable. A rotary spring is installed in the route part 232. When a button 240 is pressed in the locked state in FIG. 1, the locked state is released, and the rotary spring provides an elastic force in a direction in which the locking handle 230 is opened.

The route part 232 of the locking handle 230 has a front bent in an arc shape towards the slider 110. The second teeth 233 are formed on the front by corresponding to the first teeth 111 of the slider 110 along a rotating direction. In a process of rotating the locking handle 230 from an unlocking location to a locking location, a shape of the route part 232 and an interval between the route part 232 and the slider 110 has to be appropriately adjusted so that the first and second teeth 111 and 233 come into contact with each other or are engaged with each other.

The above-described locking means may be seen more specifically with reference to FIG. 4.

Figure 4A:
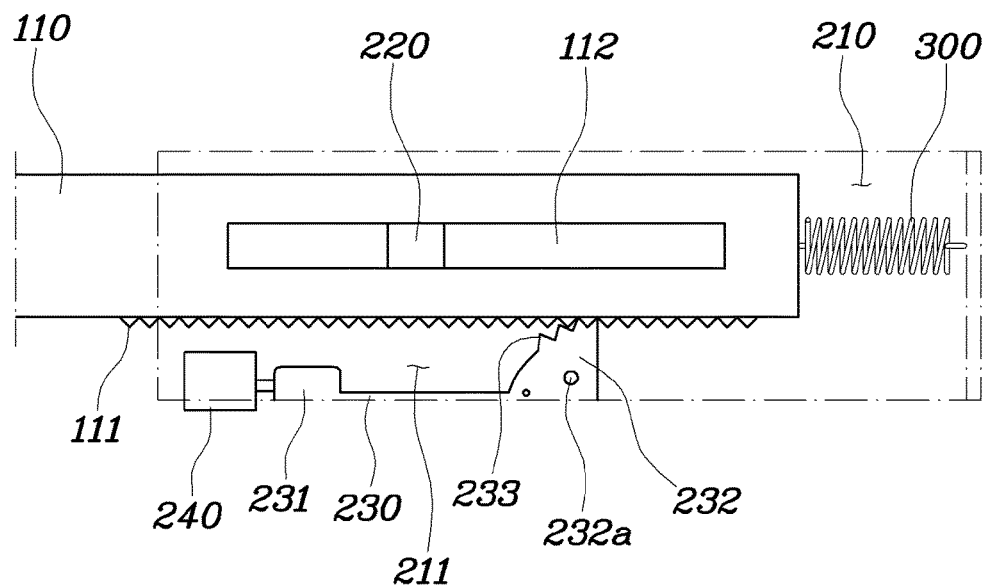
FIG. 4a illustrates a locked state.

FIG. 4a is a view corresponding to a state in FIG. 1. Since an elastic spring 300 is slightly pressed at the locking location, an elastic force is provided to the first and second parts 100 and 200 in a spacing direction. The route part 232 has a fan shape on the basis of a rotary shaft 232a.

When the button 240 is pressed and thus restraint of the head part 231 is released in a state of FIG. 4a, the locking handle 230 rotates in a counterclockwise direction to be opened due to a restoring force of each of the rotary spring fitted to the rotary shaft 232a and the elastic spring 300.

Figure 4B:
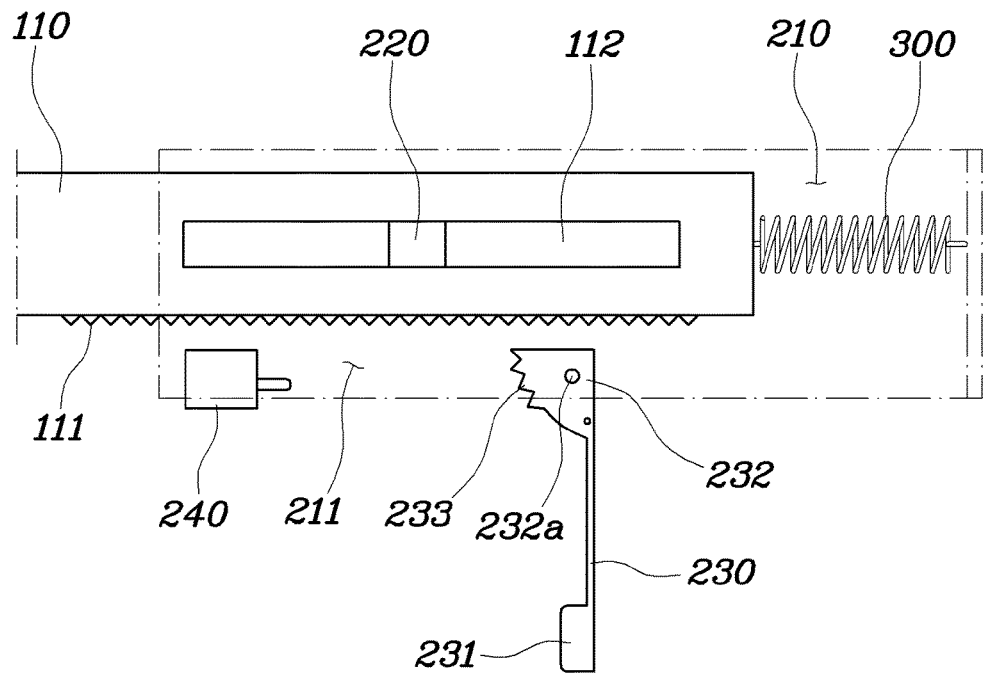
FIG. 4b illustrates an unlocked state.

On the contrary, a process in which an unlocked state of FIG. 4b is converted to a locked state of FIG. 4a will be examined.

When the locking handle 230 is rotated in a clockwise direction in the state of FIG. 4b, the slider 110 becomes close within a rotating radius of the route part 232 and thus the first teeth 111 and the second teeth 233 may be engaged with each other at a particular rotation angle.

A location in which the first and second teeth 111 and 233 are engaged with each other first is set as a location to which a force in a frontward direction to the slider 110 due to the route part 232 may be provided by an operation for rotating the locking handle 230 to the locking location.

Since the route part 232 rotates in the clockwise direction on the basis of the rotary shaft 232a, when the route part 232 rotates at a predetermined angle after the second teeth 233 and the first teeth 111 are engaged with each other first, in an additional rotation operation (in a clockwise direction), the slider 110 engaged with the second teeth 233 receives a force of frontward movement.

As described above, providing the force to the slider 110 in a frontward direction in a final operation for rotating the locking handle 230 from the unlocked state to the locked state has an advantage that an additional fixing force may be gained when using the musical instrument stand to tightly fix the musical instrument.

Figure 5:
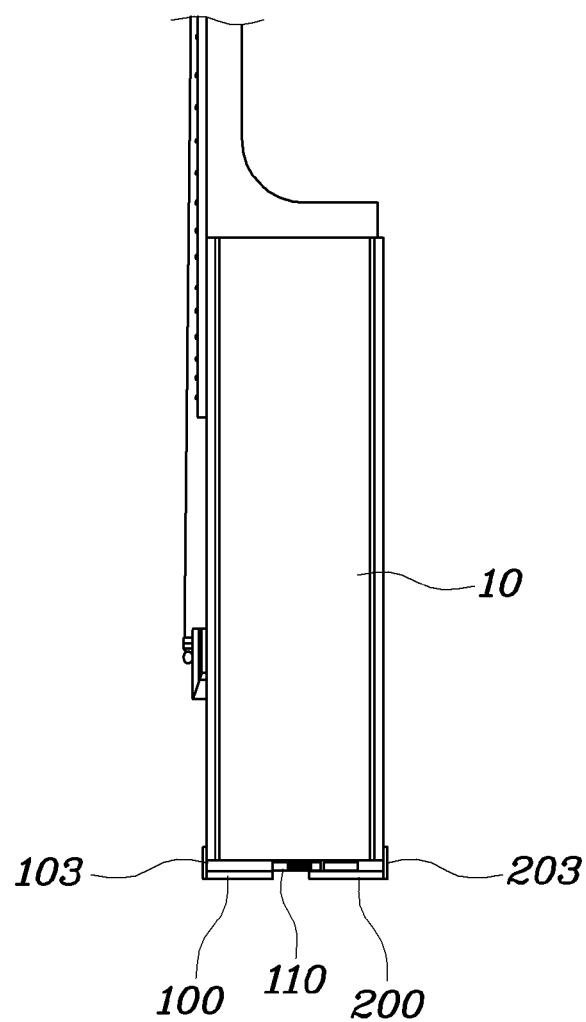
FIGS. 5 and 6 are views illustrating an example in which the musical instrument stand according to the embodiment of the present invention is used.
Figure 6:
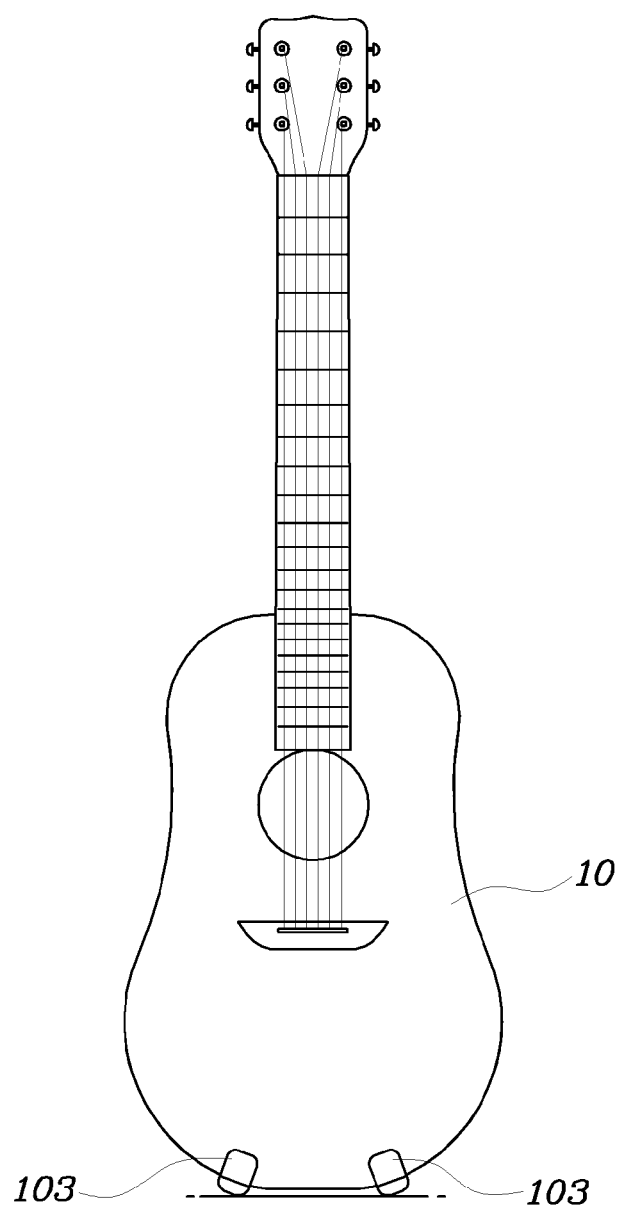

Referring to FIGS. 5 and 6, two musical instrument stands according to the embodiment are installed to be laterally spaced apart from each other at a lower part of the musical instrument 10.

When the button 240 of the musical instrument stand is pressed to perform the unlocking to mount the musical instrument stand on the musical instrument 10, the first and second parts 100 and 200 may be pulled to elongate the stand. When a length of the stand is elongated, a restoring force of the elastic spring 300 is applied between the first and second parts 100 and 200.

When the musical instrument stand is elongated and thus the stopper pieces 103 and 203 of the first and second parts 100 and 200 are hooked on both sides of the lower part of the musical instrument 10, the first and second parts 100 and 200 are pulled by the restoring force of the elastic spring 300 and thus the stand is fixed to the musical instrument.

As described above, when the locking handle 230 is rotated to be in the locked state like FIG. 4a in a state in which the stand is hooked on and fixed to the lower part of the musical instrument 10, the slider 110 receives an additional force in a frontward direction due to the second teeth 233 of the route part 232 in a locking operation, and a tightly fixing force of the stand is improved.

As shown in FIGS. 5 and 6, when the two musical instrument stands according to the embodiment are installed to be laterally spaced apart from each other at the lower part of the musical instrument 10, since not only lateral movement but also frontward and rearward movement are fixed, the musical instrument 10 may be stable enough to be stood up even when not leaning on the wall to be stood up.

As described above, separation of the stand mounted on the musical instrument 10 may proceed by releasing the locking and adjusting the length after separating the stand from the musical instrument 10 by pulling. For convenient separation, a rotary spring force of the route part 232 may be increased, and restraint of the head part 231 to the support body 201 in the installation space 211 may be easily released when the button 240 is operated.

Continuously referring to FIGS. 1 and 6, in the musical instrument stand according to the embodiments, pads 102 and 202 made of an elastic material are provided on lower parts of the support bodies 101 and 201 for shock absorption and user convenience. Preferably, both lower side edges 104 and 204 in longitudinal directions of the pads 102 and 202 are formed to be round.

As shown in FIG. 6, a bottom part of the musical instrument 10 having a sound box has a gradually curved line shape rather than a flat shape, and curvature thereof increases at both lateral edges. When the stand is mounted on the lateral edges having high curvature, stability becomes lower than when a lower surface of the stand is flat because angular edges of a lower surface of the stand should only come into line contact with a floor.

The pads 102 and 202 on the lower parts of the support bodies 101 and 201 may each have a round shape, and unless the pads 102 and 202 are put over the support bodies 101 and 201, the both lower side edges 104 and 204 in the longitudinal directions of the pads 102 and 202 may be formed to be round.

The above-described locking means is provided to temporarily fix the length of the musical instrument stand or limit length adjustment and does not have to have a teeth structure as shown in the embodiment. A location of the first part 100 may be fixed with respect to the second part 200 by providing a particular shape to each of the slider 110 and the route part 232.

As described above, the particular embodiment of the present invention is shown and described, but it is necessary to understand that the present invention may be variously changed and transformed within the scope of the present invention without departing from the spirit of the present invention disclosed in the claims.

The invention claimed is:

1. A musical instrument stand including:
   a first part having a first stopper piece configured to extend in an upward direction from one side of a first support body on which a musical instrument is laid and a slider configured to extend in a longitudinal direction on the other side;
   a second part to which the first part is elastically connected in a state in which a second support body and a second stopper piece are provided in a shape laterally symmetrical to the first part, the slider accommodation groove is formed in the second support body, and the slider is inserted into the slider accommodation groove; and
   a locking handle having a route part rotatably fixed to a second part,
   wherein the slider is fixed at a locking location by the route part.

2. The musical instrument stand of claim 1,
   wherein the route part has a front bent in an arc shape towards the slider,
   wherein the slider is pressed by the front or engaged with the front to be fixed at the locking location.

3. The musical instrument stand of claim 2,
wherein, in a process of rotating the locking handle to the locking location,
the slider is located in a rotating radius of the route part and the route part is configured to providing a force to the slider in a frontward direction.

4. The musical instrument stand of claim 3,
wherein first teeth are formed on one surface of the slider,
wherein second teeth corresponding to the first teeth are formed on the front of the route part,
wherein the first teeth and the second teeth are engaged with each other in the process of rotating a locking handle to the locking location.

5. The musical instrument stand of claim 1,
wherein each of the first support body of the first part and the second support part of the second part has a round lower edge in the longitudinal direction.

6. The musical instrument stand of claim 1,
wherein a first pad formed of an elastic material is provided on a lower part of the first support body of the first part,
wherein a second pad formed of an elastic material is provided on a lower part of the second support body of the second part.

7. The musical instrument stand of claim 1,
wherein an elastic force is provided to the first part and the second part in a direction spaced apart each other.

8. The musical instrument stand of claim 1,
wherein a slit is formed in the slider along the longitudinal direction,
wherein a guide which the slit is inserted into is provided in the second part.

9. A musical instrument stand comprising:
a first part having a first stopper piece configured to extend in an upward direction from one side of a first support body on which a musical instrument is laid;
a second part having a structure laterally symmetrical to the first part and elastically connected to the first part to be extendable in a longitudinal direction with respect to the first part; and
a locking handle having a route part rotatably fixed to the second part,
wherein the first part is fixed at a locking location by the route part.

10. The musical instrument stand of claim 9,
wherein each of the first support body of the first part and the second body of the second part has a round lower edge in the longitudinal direction.

11. The musical instrument stand of claim 9,
wherein the route part has a front bent in an arc shape towards a slider,
wherein the slider is pressed by the front or engaged with the front to be fixed at the locking location.

12. The musical instrument stand of claim 10,
wherein, in a process of rotating the locking handle to the locking location, the slider is located in a rotating radius of the route part and the route part is configured to providing a force to the slider in a frontward direction.

* * * * *